United States Patent [19]

De Santo

[11] 4,023,668
[45] May 17, 1977

[54] IN-LINE CONTINUOUS CHECKWEIGHER

[76] Inventor: Joseph J. De Santo, Hillcrest Road, RD, Belle Mead, N.J. 08502

[22] Filed: Dec. 16, 1974

[21] Appl. No.: 532,957

[52] U.S. Cl. .................................. 198/504; 177/16
[51] Int. Cl.² .......................................... B65G 69/00
[58] Field of Search ............... 198/39, 126; 177/16, 177/211, 255; 209/121

[56] References Cited

UNITED STATES PATENTS

| 1,617,301 | 2/1927 | Reddick et al. ................ 198/39 |
| 2,511,672 | 6/1950 | Kemmer ........................ 198/126 X |
| 3,498,397 | 3/1970 | De Santo ....................... 177/255 X |
| 3,539,027 | 11/1970 | Fathauer ........................ 177/16 |

Primary Examiner—John J. Love
Assistant Examiner—Douglas D. Watts

[57] ABSTRACT

A portable checkweigher comprising an endless belt conveyor entity with drive motor suitable to be inserted into a conveyor line for checking the weight of continuously moving commodities is disclosed. The conveyor entity is mounted upon a weight sensor which cooperates with integration circuitry to nullify convention of error-producing variations in weight readings.

2 Claims, 4 Drawing Figures

IN-LINE CONTINUOUS CHECKWEIGHER

BACKGROUND OF THE INVENTION

This invention relates to weighing devices, or checkweighers, for conveyor lines and more particularly to an arrangement in which a segment of such a line is supported atop a weight sensor.

Weighing devices in an assembly line are situated so as to sample weigh, or weigh individual commodities passing over the line for controlling, automatic filling and loading devices. They are of various types and kinds but perhaps one of the most widely used is the integrated belt segment and weighing device. The latter can be inserted at any point in a line and it provides a separate belt drive to continue the movement of commodities over the weighing head and to adjacent belt line systems.

These portable belt-weighers, however, are known to have a high degree of error in their weight scale readings. Attempts to reduce the errors by scale compensation circuits has proven unsuccessful, largely because such errors are caused by structural deficiencies, by the off-set loading of the commodities themselves and are inherent to the system design.

In the majority of prior art belt-weighers, a weighing platform and its sensor are both placed centrally under a section of the horizontal portion of a moving belt. The belt is designed with sufficient slack between supporting rollers to allow the commodity on the belt to rest momentarily on the weighing platform for the sensor to take a weight reading. In practice, to obtain the necessary slack without severe motor slip the horizontal length of the belt assembly is required to be at least four feet between supporting end rollers. This requirement gives rise to two error producing conditions. One, the off-set loading (moment effect of a commodity resting on the end of a belt assembly) of such a long conveyor belt produced erroneous weigh readings which are unpredictable when measuring loose material (e.g., sugar, sand, etc.). Two, the belt slack required to permit the commodity to contact the weight head is variable and dependent upon the number of articles simultaneously present on the belt during weighing. Also imperfections in the belt itself tended to introduce errors in weight readings. Attempts to solve the foregoing problems by increasing the spacing between articles required also that the belt speed be increased in order to maintain the same production output. This solution was both impractical and tended to worsen the reading errors.

Thus, it is an object of the present invention to provide a belt-weigher suitable for insertion in a conveyor line which overcomes the foregoing problems and reduces the potential for weighing errors due to mechanical problems and other inherent problems of the assembly design.

It is also another object of this invention to provide a checkweigher which is relatively small by comparison to prior art conveyors and exhibits a high degree of accuracy in weight reading.

STATEMENT OF THE INVENTION

The foregoing object as well as others are achieved in accordance with this invention which in its preferred form comprises an endless belt with a drive motor all situated atop a weight sensor, and, importantly, atop the platform. The belt area is relatively small, tailored to the commodity size, and does not therefore have the off-set loading problems of the prior art. Also, the weight platform is no longer associated with the belt or the belt flexures, and in the preferred embodiment herein, the belt slack plays no part in the weight indication. Importantly, all structures (belt, drive motor, etc.) which contribute errors to weight readings are atop the sensor and the associated circuitry integrates out such variations.

The aperture, or period during which an article is potentially available over the weigh head for weighing, is vastly improved. In the prior art the aperture was equivalent to the platform length, which was necessarily small. However, in the present invention the aperture is equivalent to the width of the horizontal belt segment of the belt assembly. This significantly wider aperture means the commodity is exposed on the weight sensor longer and thus the accuracy of weight reading is increased.

In accordance with yet another feature of this invention an optical sensor is employed to trigger the integration cycle by which variations in weight registrations are integrated out. The advantage here is that transit (i.e., when portions of two articles are simultaneously on the belt) as well as all other cyclical errors are eliminated by integration.

The belt section in contact with the moving article is small, being approximately twice the length of the article. Besides the advantage of a reduced space requirement and the attendant economies, the vertical loading on the sensor during the transit interval, is constant. Thus vibrations in the weight sensor itself, which are a problem when the sensor is subjected to rapidly changing loads, (particularly serious in the conveyors with off-set loads) are avoided.

These as well as other objects will be appreciated from a consideration of the drawing which includes:

FIG. 1 showing a plan view of the weighing assembly constructed in accordance with this invention and showing the same to be an endless belt checkweigher situated atop a weight sensor and being interposed within a conveyor line;

FIG. 2 being a top view taken along section line 2—2 of FIG. 1 depicting the restraining arrangement of the weight sensor;

FIG. 3 being a graph which depicts the loading of the weight sensor; and

FIG. 4 shows the integration circuit responsive to the weight sensor for giving a digital display.

DETAILED DESCRIPTION

Figure 1:
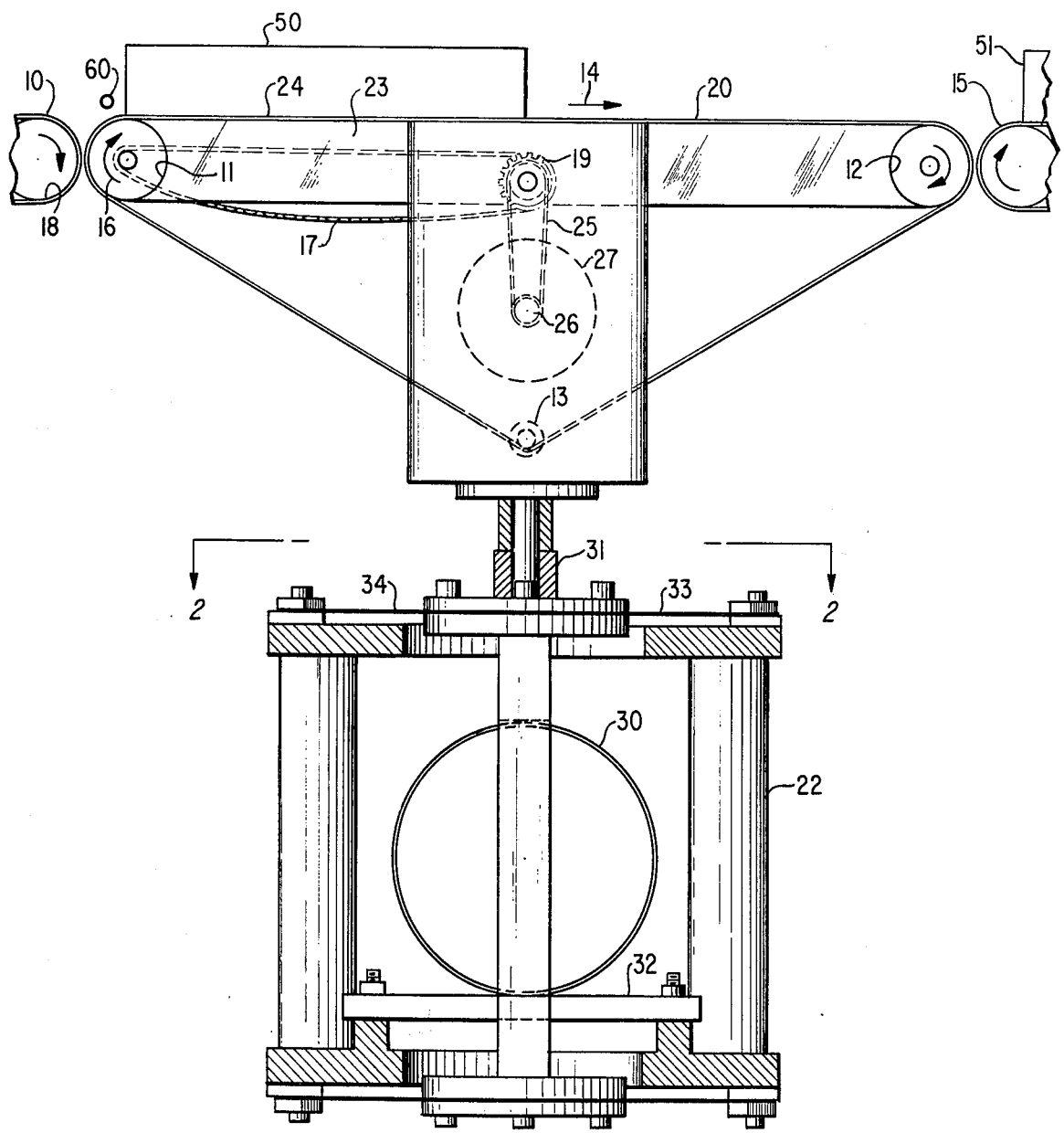

Referring to FIG. 1, an endless conveyor mechanism 10 is indicated which is effective to move commodities (e.g., articles 50 and 51) placed upon the conveyor belt thereof in the direction indicated by arrow 14. Disposed in spaced relationship to this conveyor mechanism 10 is a further conveyor mechanism 15 (right-hand side of figure) and spanning the gap between these two conveyor mechanism 10 and 15 is conveyor mechanism 20 constructed and mounted atop the weight sensor 22 in accordance with the present invention. The mechanism 10, as well as mechanism 15 which is similarly formed, includes a roller 18 (a drive shaft) which defines in a general sense the terminal end of the conveyor mechanism.

An important aspect in accordance with the present invention is the isolation and portability of the conveyor mechanism 20 from the two mechanisms 10 and 15, which form a part of the whole conveying system. In this respect, it will be appreciated that the purpose of the weighing or checking mechanism (also "checkweigher") is to operate associated mechanisms, not shown, which may divert or direct "over or under" weight commodities from the main stream of commodities moving along the conveying stream. Such mechanisms are also used (not shown) to control filling/loading of cartons.

The conveying mechanism 20 incorporates as main components thereof an endless belt 24 and horizontal platform 23 (not to be confused with a weighing platform) over which belt 24 passes and which provides support for articles (such as article 50) moving along belt 24 during their passage thereover toward the discharge end of the assemblage 20 which is to the right in FIG. 1. Mechanism 20 also includes roller 11–13 supporting belt 24 and driving it in the direction of arrow 14. Roller 11 is the drive roller being rotated as indicated by arrow 16 via bead chain 17 which is in turn driven by a sprocketed gear 19. The latter is driven over a chain drive 25 which is connected to the drive shaft 26 of motor 27. All of the above is part of assemblage 20 which in accordance with this invention importantly is situated atop of weight sensor 22.

The mechanism which actually performs the weighing operation is shown in the lower half of FIG. 1. In the preferred embodiment, sensor 22 is of a special type which limits all essential movement of the weigh head except directly onto (downward) the sensor ring 30 (herein a "proving ring"). The off-set loading problem which is substantially eliminated by this design is further improved therefore by the sensor design. Such a system, as applicant teaches, heretofore has also been impractical because no sensor was available having the capability of limiting "sensor motion" to a substantial load point. Thus, lateral motion (off-set loading) on sensor 22 and is effectively eliminated. For a more detailed discussion of this type of sensor see U.S. Pat. No. 3,498,397 issued to applicant hereof.

Figure 2:
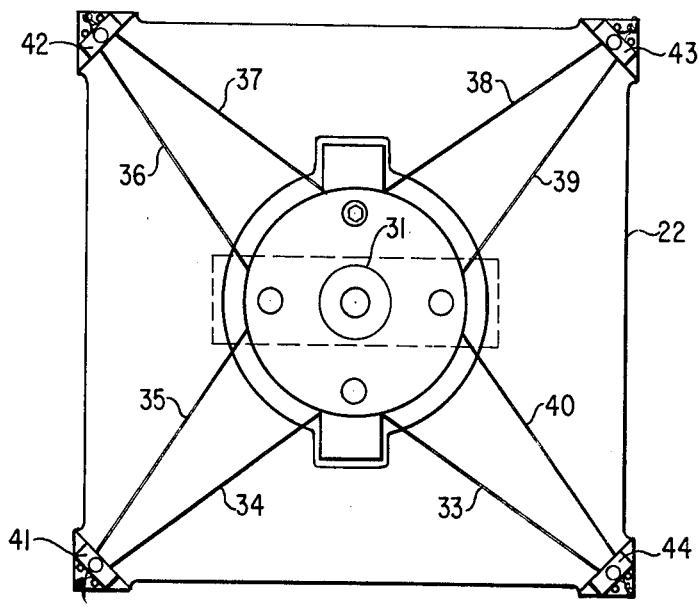

Briefly, sensor 22 comprises proving ring 30 the top of which is directly connected via beam 31 to belt assemblage 20. The bottom portion of ring 30 is situated on fixed platform 32 rigidly situated with respect to the flexure ring 30. The sensor 22 has a top and bottom set of wires (portions 33 and 34 seen in FIG. 1) which are substantially identical and when which serve to guide all vertical motion and restrain off-set motion, FIG. 2 looks down on the sensor and depicts the top set of wires comprising portions 33–40 which are held by posts 41–44.

Figure 4:
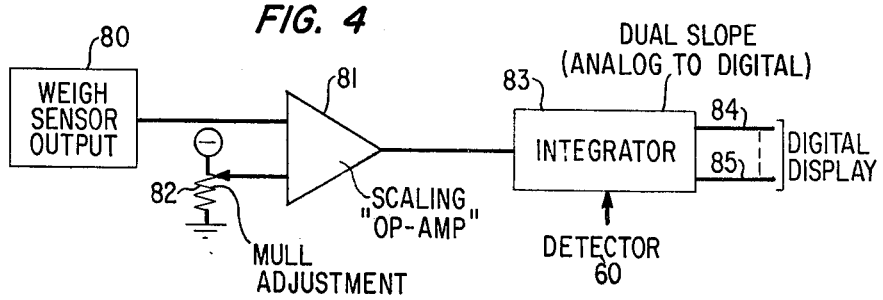

One of the major advantages of my invention is that substantially all error producing structures are incorporated into the weighed assemblage and therefore one adjustment to compensate (set-to-zero) for the weigh head, compensates for all variations at one time. Further, the integration function of the sensor reading circuit (FIG. 4) tends to integrate out such reading errors.

An important aspect of this invention pertains to the aperture (weight head reading period) loading and the relationship of conveyor belt length to the size of the commodity carried by the conveyor. Ideally, systems of this type strive to achieve two objects, compactness and accuracy. For the reasons discussed hereinbefore, no prior art system has been able to satisfactorily achieve both objects. In this invention the horizontal belt size approaches (but never quite reaches) the precise length of the commodity. This is true because the aperture is the belt length minus the commodity length. Thus, extremely high package speeds can be achieved. In its preferred form, the horizontal belt length is made approximately twice the width of the articles to be weighed and the spacing between articles on the line is equivalent to the length of the article itself. The advantages of this arrangement may be best appreciated from a consideration of FIG. 3 in which the abscissa denotes time and the ordinate indicates loading on the head of sensor 22.

Figure 3:
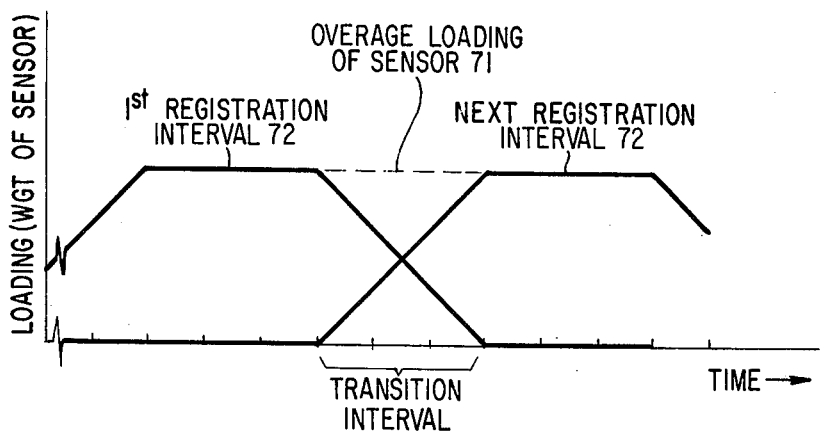

As FIG. 3 shows the average loading of the weight sensor (line 71) during te transition interval is constant. Now, in practice, variations in the spacing of articles on a line do occur, but such variations are on the average infrequent and slight. On the average, therefore, the sensor head is constantly loaded with the same weight undulations in the reading output are negligible. Further, integration of the sensor output tends to nullify such periodic contributions.

Referring once again to FIG. 1, article 50 is shown moving in the direction indicated by arrow 14. To the left of the article is shown an optical detector 60 positioned at the left-hand edge of assemblage 20. Detector 60 is symbolically depicted here and it may be any one of a number of designs capable of a voltage (or current) output when not blocked by an article which is positioned left of article 50 as shown in FIG. 1. Detector 60 herein controls an indicating circuit in accordance with FIG. 3 such that the circuit is not responsive during the transition interval. A circuit configuration is given in FIG. 4 which functions as follows. Sensor output 80 depicts the device which converts displacement (bending) of ring 30 into a current drive for Scaling "OP-AMP" 81. Another input to OP-AMP 81 (an operational amplifier) is from a null adjustment 82 which functions to cancel from the output of OP-AMP 81 the contribution of the entire conveyor belt with drive. OP-AMP 81 and the output of detector 60 drive dual slope 83 which produces a digital display via leads 84–85. This latter circuit 83 integrates the function presented to it to develop the signal on those leads.

What is claimed is:
1. In a high speed check weighing system, a frame including a platform,
   drive means mounted on said frame beneath said platform near the receiving end of said platform, support means carried by said frame adjacent the discharge end of said platform.
   endless conveyor means being disposed over said support means and said drive means and having a horizontally disposed article-supporting portion,
   a vertical support member included as part of said frame having a connecting arrangement at the bottom thereof, and
   a weight sensor having a mating connector on top thereof disposed to receive said connecting arrangement for indicating the weight of the entire endless belt checkweigher as well as the commodities transported thereover, wherein said weight sensor includes a proving ring and means disposed in different horizontal planes attached to the portions of said sensor which is adopted to deflect under weight loads to eliminate all readings except those along a single load line.

2. A system for continuously moving commodities as wall as for accurately check weighing such commodities as they are transported at high linear velocities, comprising in combination;
- a T-shaped framework;
- said framework including a horizontally disposed platform suitable to support a moving belt thereon;
- a roller member disposed at the discharge end of said platform both to support commodities and said belt;
- a drive roller disposed at the receiving end of said platform disposed to be driven by a drive train supported on said framwork;
- a drive motor, a drive train including a plurality of gear stations and drive chain for connecting to said drive roller;
- a third idler roller;
- an endless belt conveyor disposed on said drive roller, said roller member, saod platform, and said idler roller;
- a vertical member forming part of said T-shaped framework having a connecting arrangement at the bottom thereof comprising exclusively a beam, and
- a weight sensor arranged to be located under said T-shaped framework and connected thereto via said connecting arrangement for indicating the weight of commodities as differences detected in the weight of said entire belt checkweigher while commodities are being transported thereover.

* * * * *